(12) United States Patent
Lais et al.

(10) Patent No.: US 8,171,668 B2
(45) Date of Patent: May 8, 2012

(54) SPECTRALLY SELECTIVE GROW TUBE

(75) Inventors: Joseph F. Lais, St. Paul, MN (US); Christian E. Siems, Northfield, MN (US); Stephen J. Tillmann, Atascadero, CA (US)

(73) Assignee: Plantra, Inc., Mendota Heights, MN (US)

( * ) Notice: Subject to any disclaimer, the term of this patent is extended or adjusted under 35 U.S.C. 154(b) by 464 days.

(21) Appl. No.: 12/410,266

(22) Filed: Mar. 24, 2009

(65) Prior Publication Data

US 2009/0272031 A1    Nov. 5, 2009

Related U.S. Application Data

(60) Provisional application No. 61/070,580, filed on Mar. 24, 2008, provisional application No. 61/053,915, filed on May 16, 2008, provisional application No. 61/054,381, filed on May 19, 2008, provisional application No. 61/154,672, filed on Feb. 23, 2009.

(51) Int. Cl.
*A01G 13/02* (2006.01)

(52) U.S. Cl. .............................. 47/29.1; 47/30

(58) Field of Classification Search .......... 47/29.1–29.4, 47/20.1, 32.1, 31.1, 30
See application file for complete search history.

(56) References Cited

U.S. PATENT DOCUMENTS

| | | | | |
|---|---|---|---|---|
| 4,267,665 A | * | 5/1981 | Wallace et al. | 47/29.1 |
| 4,686,791 A | * | 8/1987 | Miyata | 47/29.4 |
| 4,829,707 A | * | 5/1989 | Koffler et al. | 47/29.2 |
| 4,895,904 A | * | 1/1990 | Allingham | 523/135 |
| 5,090,155 A | * | 2/1992 | Rodgers | 47/30 |
| 5,375,368 A | | 12/1994 | Motz, Jr. | |
| 5,426,887 A | * | 6/1995 | Spencer et al. | 47/29.2 |
| 5,692,337 A | | 12/1997 | Motz, Jr. | |

(Continued)

FOREIGN PATENT DOCUMENTS

DE    32 13 006    10/1983

(Continued)

OTHER PUBLICATIONS

Written Opinion of the International Searching Authority for International Application No. PCT/US2009/038115, dated Oct. 7, 2010.

(Continued)

*Primary Examiner* — Kristen C Hayes
(74) *Attorney, Agent, or Firm* — Patterson Thuente Christensen Pedersen, P.A.

(57) ABSTRACT

A spectrally selective grow tube or tree shelter that improves the establishment of woody plant forms by reduction and/or elimination of certain biotic and abiotic stress factors. The grow tube may provide an enhanced micro climate that is humid and rich in $CO_2$ and promotes photosynthesis by selectively propagating photosynthetically active radiation. In addition to providing a physical barrier to wind and herbivores, certain embodiments of the grow tube can also provide protection from chemical sprays while permitting ventilation of the grow tube. Various embodiments of the spectrally selective grow tube may comprise separate interior and exterior members for enhancement of the interior and exterior surface functions and that may be co-extruded. The interior member may be dyed or pigmented to selectively transmit wavelengths of the visible spectrum known to promote photosynthesis, such as red light and/or blue light. The exterior member may include a semi-reflective coating such as $TiO_2$ or ZnS that reflects at least a portion of the visible light spectrum while enabling transmission of infrared wavelengths therethrough for radiative cooling.

15 Claims, 10 Drawing Sheets

U.S. PATENT DOCUMENTS

| | | | | |
|---|---|---|---|---|
| 5,953,857 | A * | 9/1999 | Aiga et al. | 47/29.4 |
| 6,378,459 | B1 * | 4/2002 | Potente | 119/57.9 |
| 7,866,089 | B2 * | 1/2011 | Iwig et al. | 47/23.1 |
| 2006/0150475 | A1 | 7/2006 | Franco et al. | |
| 2007/0184274 | A1 * | 8/2007 | Wheatley et al. | 428/411.1 |
| 2010/0299993 | A1 | 12/2010 | Lais et al. | |

FOREIGN PATENT DOCUMENTS

| | | |
|---|---|---|
| DE | 20 2006 011559 | 10/2006 |
| EP | 0 193 902 | 9/1986 |
| EP | 0 340 313 | 11/1989 |
| EP | 0 428 937 | 5/1991 |
| EP | 0 904 687 | 3/1999 |
| WO | WO94/05727 | 3/1994 |

OTHER PUBLICATIONS

Mullens, et al., "Biology of Horticultural Crops: Biology of the Grapevine", Cambridge University Press. 1998, p. 83.

Folta, "Green Light: A Signal to Slow Down or Stop", Journal of Experimental Botany, Jul. 2007.

Application and File History for U.S. Appl. No. 12/767,415, filed Apr. 26, 2010, inventor(s) Lais et al.

International Search Report and Written Opinion of the International Searching Authority (PCT/US2009/038115), dated Sep. 16, 2010.

Red Tomato Teepees http://www.gardeners.com/Red-Tomato-Teepees/34-952,default,pd.html?SC=XNET8LB1 Prior to Mar. 24, 2009.

Red Tomato Servers http://www.gardeners.com/Red-Tomato-Savers/33-822,default,pd.html?SC=XNET8002 Prior to Mar. 24, 2009.

Ultimate Tomato Growers Kit http://www.burpee.com/gardening-supplies/tomato-helpers/ultimate-tomato-growers-kit-prod001292.html?catId=cat40026&trail Prior to Mar. 24, 2009.

Tomato and Pepper Automator Trays http://www.burpee.com/gardening-supplies/garden-growers/tomato-pepper-automator-trays-prod001247.html Prior to Mar. 24, 2009.

Reflective Red Mulch Film http://www.burpee.com/gardening-supplies/garden-growers/reflective-red-mulch-film-prod001306.html?catId=cat40026&trail= Prior to Mar. 24, 2009.

Taber et al., "Effect of Red Plastic Mulch on Early Tomato Production", 6 pages. Prior to Mar. 24, 2009.

Colored Plastic Mulches for Vegetable Gardening. Updated for 2009. 8 pages. Prior to Mar. 24, 2009.

* cited by examiner

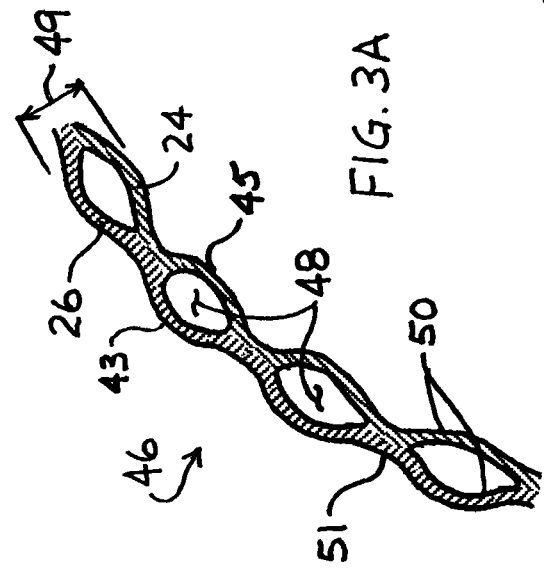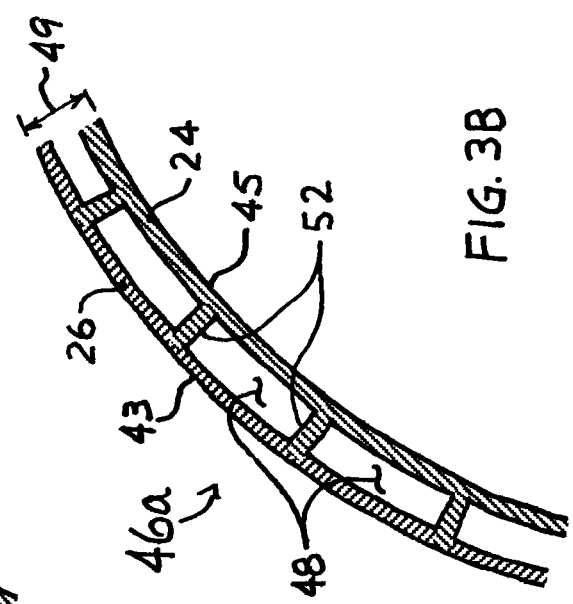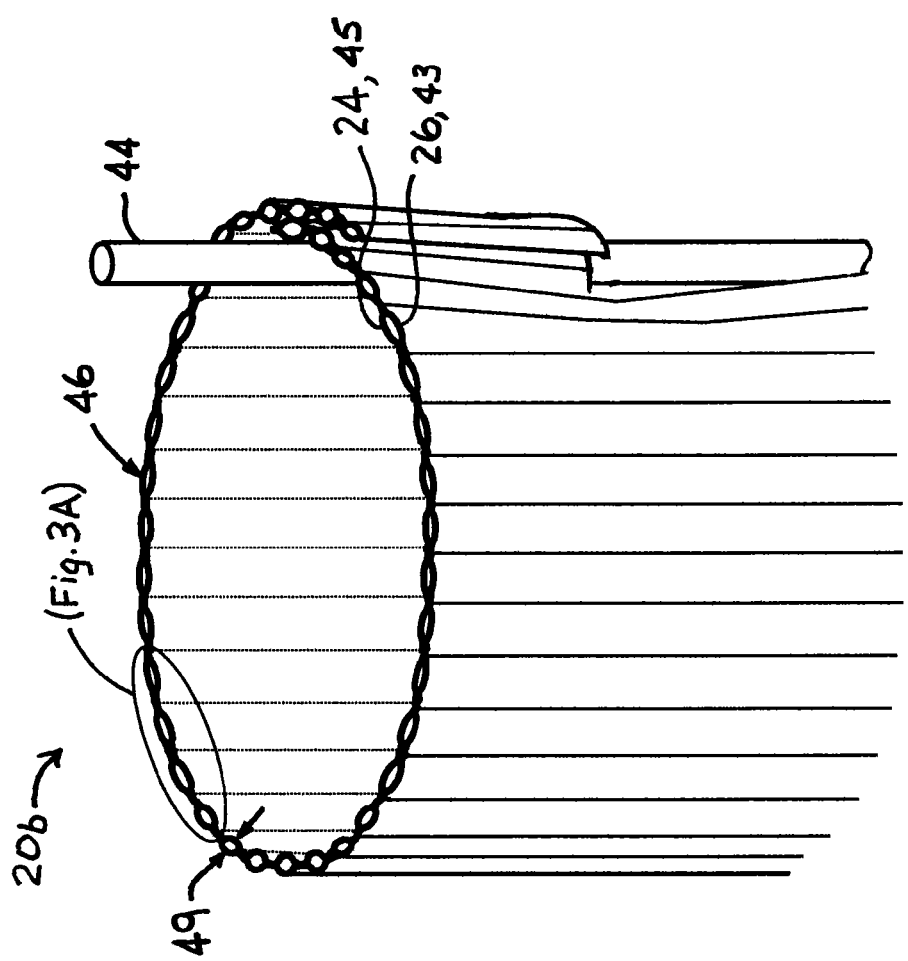

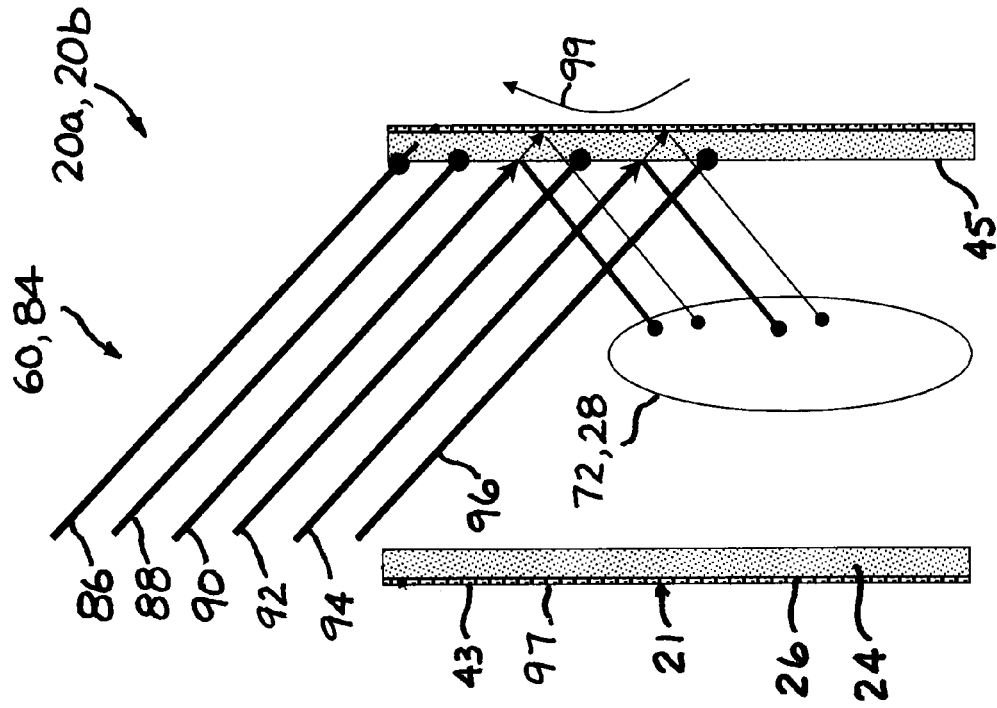
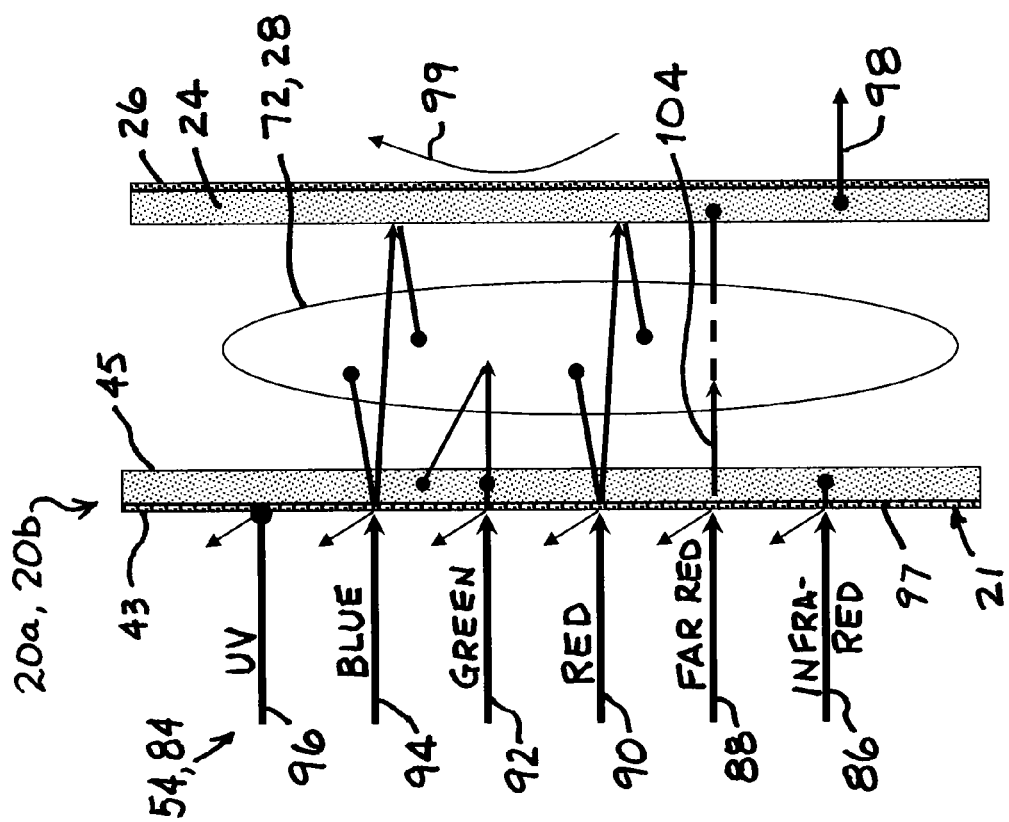
FIG. 7
FIG. 6

SPECTRALLY SELECTIVE GROW TUBE

RELATED APPLICATIONS

The present application claims the benefit of U.S. Provisional Application No. 61/070,580, filed Mar. 24, 2008, U.S. Provisional Application No. 61/053,915, filed May 16, 2008, U.S. Provisional Application No. 61/054,381, filed May 19, 2008, and U.S. Provisional Application No. 61/154,672, filed Feb. 23, 2009, all of which are hereby incorporated by reference in their entirety.

FIELD OF THE INVENTION

The disclosed invention relates generally to the field of tree shelters and grow tubes. More specifically, the invention relates to methods and structures for enhancing the performance of tree shelters and grow tubes.

BACKGROUND

Tree shelters were originally developed to prevent biotic stress caused by mammalian herbivory. This was accomplished by enclosing the seedling in a protective tube open at both ends to allow root and shoot growth. The height of the tube was a function of the stature of the herbivore. For example, 600-mm is considered adequate protection against rabbit browsing while 1200- to 1500-mm height tubes are generally prescribed to prevent deer browsing.

It was also noticed that young trees grew faster in tree shelters. The mechanisms behind this growth increase were not well understood. Tree shelters (aka grow tubes) were adapted for use in grape establishment and had the added benefit of reducing and accelerating stem training.

Accordingly, a function of a grow tube is to facilitate and promote rapid and permanent plant establishment, even where mammalian herbivory is not a factor. In horticultural systems plant survival is generally not at risk, so the purpose of a grow tube is to hasten and lower the cost of plant establishment. In a wild setting the first purpose is to ensure survival. But even in the wild setting, a component of plant establishment is to outgrow competing vegetation for nutrients, water and sunlight. Hence, rapid growth is generally considered advantageous whether in a horticultural or a wild setting.

The plant establishment period can be defined as the time when a young plant is establishing a root system that is sufficient to support the shoot and is establishing a canopy that is able to gather sufficient sunlight for photosynthesis and is growing the canopy or at least one bud to a height above the reach of local mammalian herbivores.

Poorly designed grow tubes have been known to produce shade-adapted plants, which is problematic if the established plant is to perform in a non-shaded setting (e.g. vineyards). Shade-adapted plants are often characterized by: minimum root development; flimsy stems; overly long internodes; large thin leaves; leaves with insufficient cuticle to protect the leaf in full sun; excessive and dense photoreceptors making the leaves vulnerable to damage in full sun. Inappropriate shade adaptation has been known to cause mortality in grape vines in hot sunny climates. Also, shade-adapted trees are often seen to bend at the top of the grow tube due to poor stem development. Ironically, the shade avoidance response of a tree or vine is often misinterpreted as an increase in growth. The shade avoiding plant allocates stored carbohydrate reserves away from root and stem caliper growth to stem elongation.

A sun-adapted plant typically has smaller leaves with a thicker protective cuticle, a thick stem and good root development. In general, the root and shoot are in balance. The primary controlling mechanism is the red/far-red light balance as detected by the phytochrome pigment system.

Grow tubes substantially enhanced the growth of oak seedlings in the moderate climate found in United Kingdom. Not all climates, however, are as ideal for conventional grow tubes as United Kingdom. In the summer, United Kingdom enjoys plentiful rainfall, cloudy skies that reduce and diffuse sunlight, and temperature maximums below the limits that stress plants. In the winter, it rarely freezes and sunlight is low and diffuse, reducing the likelihood of sun warmed plant tissues emerging from dormancy and then freezing.

In other climates, winter trunk guards are utilized, employing the principles of radiative cooling to prevent uneven solar warming on one side of the trunk and the attendant sun scald and bark cracking of thin barked species such as maple trees. Some winter trunk protection systems comprise radially corrugated tubes akin to field drain tile that are coextruded white on the outside and black inside. The outer white surface reflects most solar radiation. Energy in the trunk is emitted in the form of infrared radiation, absorbed by the interior surface of the trunk protector, and removed from the trunk guard via convection and radiation to the ambient surroundings. By the these mechanisms the trunk temperature stays close to ambient and avoids large temperature differences from the sunny to shady side of the trunk.

Nevertheless, the problems associated with tree shelters and grow tubes often arise from a poor understanding of the stresses on a plant in a confined space and how these stresses are exacerbated by solar radiation. Problems caused by inappropriate radiation include: poor root development; summer dieback and whole plant death; winter dieback and whole plant death; trees with spindly misshapen stems/trunks; a living plant that has nevertheless failed to establish in wild settings; vines that after an initial growth spurt pause for too long.

Currently, some grow tubes include ventilation apertures or perforations that pass through the walls of the grow tube to control temperature and humidity within the grow tube and promote dormancy in broadleaved trees and survival of conifers. A concern is that contact herbicides used adjacent the grow tube will migrate into the grow tube via the ventilation apertures and damage the occupying plant. Accordingly, existing ventilation constructions often force a compromise between effective ventilation and effective weed control with contact herbicides. For example, common practice for tall treeshelters used on broadleaves is to limit the location of ventilation holes to above the spray zone, which may compromise ventilation effectiveness. Shorter tubes used for conifers are completely ventilated, which can preclude the use of contact herbicides altogether.

While grow tubes have proven successful in preventing browsing of certain mammals such as deer and rabbits, they have been known to actually attract other forms of pestilence. For example, wasps have been known to harbor on the interior of grow tubes, creating hazards for attending personnel. Also, rodents have been known to chew through the grow tube near the base and to nest within the grow tube, which can cause stresses on the resident plant including complete stem girdling.

Animals and insects are not the only creatures that pose hazards to grow tubes. Grow tubes are often the target of vandalism.

Grow tubes that address variously the issues of sun and shade adaptation, herbicide encroachment, pestilence attraction and vandalism would be a welcome addition to the horticultural and agricultural industries.

SUMMARY OF THE INVENTION

Various embodiments of the invention provide a spectrally selective grow tube or tree shelter that hastens and improves the establishment of plant forms by reduction and/or elimination of certain biotic and abiotic stress factors. The grow tube may provide an enhanced micro climate that is humid and rich in $CO_2$ and promotes photosynthesis by selectively enabling the blue and/or the red band passes, which contain photosynthetically active radiation (PAR), and to propagate the PAR in a scattered or diffuse manner. The spectrally selective grow tube may thereby provide a balanced, hardy growth of the root system, shoot structure and plant form without retarding dormancy. In addition to providing a physical barrier to wind and herbivores, certain embodiments of the grow tube can also provide protection from chemical sprays while permitting ventilation of the grow tube, and also discourage the colonization of pestilence such as insects and rodents within the grow tube. The grow tubes of the present invention may also comprise a cryptic appearance, thus blending in with the surroundings and reducing the invitation for vandalism. Herein, the word "cryptic" and its derivatives assumes the zoological meaning of "fitted for concealing; serving to camouflage."

Structurally, various embodiments of the spectrally selective grow tube may comprise an interior member and an exterior member that are co-extruded, each having an open top. The interior member may be dyed or pigmented to selectively transmit in band passes including the PAR wavelengths. The exterior member may include a semi-reflective coating that reflects at least a portion of the visible light spectrum while enabling transmission of infrared wavelengths therethrough. Such a construction can filter solar radiation that enters the grow tube. Light entering via partial transmission through the exterior member is filtered by the spectrally selective interior member, as is sunlight entering the open top via multiple reflections within the interior member. By this mechanism, a plant located within the grow tube may be bathed primarily by the preferred wavelength bands.

In one embodiment, the invention uses a co-extrusion process to create a dual wall grow tube having an outer member that is semi-reflective to visible light and transmissive to infrared radiation. The outer member so configured may be combined with having an inner member that is dyed or pigmented to further condition the light to maximize photosynthesis and plant form through photomorphogensis.

In another embodiment, an intermediate member may be disposed between the interior and exterior members. The intermediate member may serve as a radiation shield that combines with the colored interior member to promote propagation of PAR light via inter-reflection. The intermediate member may also cause solar radiation incident on the exterior member to reflect outward from the grow tube assembly. Such a "triple wall" configuration may be suitable in climates where trapped interior radiation would not over stress the plant, and enables the exterior member to have a more cryptic appearance. Alternatively, the intermediate member may be supplemented or replaced by a reflective coating on either or both of the outer surface of the interior member or the inner surface of the exterior member. In some embodiments, formation of the triple wall configuration may comprise a co-extrusion process.

In some embodiments, the invention includes small ventilation holes to replenish and maintain sufficient levels of carbon dioxide to maximize photosynthesis, prevent photorespiration and moderate internal temperatures while still preventing entry of herbicide sprays and direct sunlight. The invention uses small holes and twin wall construction to create a tortuous path that mitigates against entry of contact herbicide droplets while allowing air flow to replenish $CO_2$ and moderate internal tube temperature. Ventilation may find utility in climates where cloudless skies are commonplace for offset of passive solar heat gain.

In various embodiments, the interior member may comprise polyethylene to discourage the colonization of insects such as wasps or hornets. We have noted that grow tubes incorporating interior surfaces of polyethylene are less susceptible to such colonization, perhaps because the mechanical properties of polyethylene are not conducive to foot attachment of the nest, and/or the radiation within a polyethylene surround repel the insects.

Some embodiments may include a bittering agent such as BITREX disposed in or on the walls of the grow tube. The bittering agent can repel rodents from chewing through the grow tube. The bittering agent may be impregnated in the material of the wall or included in a coating on the surfaces of the grow tube. The potency of some bittering agents is strong enough so that only trace amounts are required, thereby accomplishing the repulsion function without adversely affecting the radiation characteristics of the grow tube. In one embodiment, only the interior member comprises or is coated with the bittering agent so that exposure of the bittering agent to personnel handling the grow tube is limited.

One embodiment of the invention comprises a grow tube having an interior member that is at least partially transparent to electromagnetic radiation in the visible portion of the electromagnetic spectrum and substantially opaque to electromagnetic radiation in the ultraviolet portion of the electromagnetic spectrum. In this embodiment, the interior member has greater transmittance in at least one of a red band pass and a blue band pass than in a green band pass. The interior member may be configured for a greater transmittance in both of the red band pass and the blue band pass than in the green band pass, and may also be configured so that the interior member has greater transmittance in the red band pass than in the blue band pass.

In some embodiments, an exterior member substantially surrounds the interior member, the exterior member being at least partially transparent to electromagnetic radiation in the visible portion of the electromagnetic spectrum and substantially opaque to electromagnetic radiation in the ultraviolet portion of the electromagnetic spectrum. The grow tube can further comprise a coating that transmits a fraction of visible light incident thereupon, the fraction being less than approximately 30%, and in one embodiment approximately 1%. The coating can be disposed on the outer surface of the exterior member, and can comprise titanium dioxide or calcium carbonate. At least one of the interior member and the exterior member can be at least partially transparent to electromagnetic radiation in the infrared portion of the electromagnetic spectrum.

The grow tube may comprise a co-extruded, unitary structure. The co-extruded unitary structure may be configured to define a plurality intermittent gaps between the interior and exterior members. In one embodiment, the interior member is comprised of polyethylene.

Various embodiments may comprise a plurality of interior ventilation apertures that pass through the thickness of the interior member, and a plurality of exterior ventilation apertures that pass through the exterior member. Each of the plurality of exterior ventilation apertures defines a corresponding area. When projected in an inward direction normal to the exterior member, the exterior ventilation apertures may defines an inwardly projected area that is totally subtended by the interior member.

The grow tube may be configured so that at least one of the interior member and the exterior member defines a continuous cross-section. The continuous cross-section may be substantially circular, with the interior and exterior members being substantially concentric. At least one of the interior member and the exterior member may further comprise a bittering agent. The interior member may further comprise a greening interference pigment and/or surface structure for scatter of electromagnetic radiation transmitted therethrough.

Various embodiments of the grow tube may be constructed so that one of the interior and exterior members comprises a structural member and the other of the interior and exterior members comprises a non-structural member disposed on the structural member. The non-structural member can comprise at least one of a film and a coating.

In another embodiment, a grow tube comprises an interior member that is at least partially transparent to electromagnetic radiation in the visible and the infrared portions of the electromagnetic spectrum and substantially opaque to electromagnetic radiation in the ultraviolet portion of the electromagnetic spectrum, the interior member having a greater transmittance in a blue and a red band pass than in a green band pass. An exterior member substantially surrounds the interior member, and an intermediate member may be disposed between the interior and exterior members, the intermediate member being opaque and having a reflectance that reflects a majority of electromagnetic radiation in the red and blue band passes. The exterior member in this embodiment is substantially opaque to electromagnetic radiation in the ultraviolet, the visible and the infrared portions of the electromagnetic spectrum. The exterior member may be partially transparent to electromagnetic radiation in the visible portion of the electromagnetic spectrum, and electromagnetic radiation passing through the exterior member may be substantially reflected by the intermediate member. The interior member can also comprise greening interference pigments.

The invention may also be embodied in a method for enhancing the micro climate within a grow tube. The method may comprise manufacturing a dual wall structure having an interior member and an exterior member, configuring the exterior member for reflection of a portion of visible solar radiation incident thereupon and for transmission of a portion of infrared radiation incident thereupon, and configuring the interior member for selective transmittance and reflectance of visible solar radiation, the selective transmittance and reflectance being greater in the red band pass and the blue band pass than in the green band pass. The method may comprise co-extruding the interior and exterior members, as well as steps for roughening at least one of an interior surface of the interior member and an exterior surface of the exterior member.

The guiding principles for the various embodiments of the invention are now presented. A basic principle in increasing plant and animal yield is to reduce stress. By way of analogy, the purpose of a barn is to reduce environmental stress on the cow. The lower the stress on the cow, the more energy and resources she has for milk production. With respect to plants, obvious stresses occur when there is too little water or sunlight. But just as too much water is a stress for some plants, too much sunlight can also be a source of stress. Plants and animals benefit from balanced amounts of inputs and that balance can be altered by excess and deficit of other inputs. Returning to the animal analogy, cows require more feed in cold weather and more water in warm weather. For most plants, higher temperatures can increase sensitivity to excess solar radiation.

A grow tube that is poorly designed or misapplied can produce plants that are shade-adapted and highly susceptible to sun and heat stresses. Certain embodiments of the invention can reduce heat and radiation stresses caused by current grow tube designs. In various embodiments, the temperature goal is to keep the grow tube as close to ambient temperatures as possible. In certain embodiments, unwanted radiation is reflected away at the tube outer surface and/or absorbed at the inner surface to generally bathe the plant in light that enhances photosynthesis. By controlling the radiation that irradiates the interior of the grow tube, a balanced root-shoot plant that has a sun-adapted morphology can be created.

Another intensity-related factor that controls photosynthetic efficiency is light scattering or light diffusion. Direct beam irradiation (non-scattered or non-diffuse) has the disadvantage of putting too many photons into a single structure and causing damage (photoinhibition). High levels of direct beam irradiance can also increase the temperature of the leaf and lead to photorespiration, whereby the plant generates $CO_2$ rather than $O_2$. These effects can cause metabolic reversal of the plant wherein the plant does not grow. Shade-adapted plants are more susceptible to the problems of direct beam irradiance than sun-adapted plants. Also, direct beam irradiation can only stimulate the photosynthetic structures that are in a certain orientation with respect to the direct beam. Diffuse light is more efficiently utilized by the plant because more photosynthetic structures are stimulated.

Chlorophyll uses red and blue light to convert $CO_2$ and $H_2O$ into carbohydrate. Chlorophyll appears green because it removes the red and blue light from the reflected visible sunlight. If photosynthesis were the only consideration, one may surmise that grow tubes should simply deliver as much red and blue light as possible to the plant leaves. However, with respect to the intensity of light, the rate of plant growth generally plateaus at a light intensity significantly less than full sun. "Light saturation for photosynthesis in $C_3$ plants is generally assumed to occur at one-third full sunlight . . . . Any increase in solar radiation intensity above saturation level will not result in an increase in leaf photosynthesis." Mullens, et al., "Biology of Horticultural Crops: Biology of the Grapevine," Cambridge University Press, 1998, p. 83. This enables design of a tube that delivers diminished intensity in one or both of the red and blue band passes while still providing full benefit to the growth of the plant.

While Mullens et al. reports a growth rate plateau above one-third full sunlight, there may actually be a decrease in plant growth above a certain threshold intensity whereat the effects photoinhibition and photorespiration are triggered, at least when one considers the susceptibility of resident plants to the additional heat stresses that can be induced by a grow tube. Accordingly, the grow tubes of the present invention may be tailored to reject a substantial fraction of the incident sunlight for the purpose of heat stress management. The fraction of rejected sunlight will typically depend on the atmospheric characteristics (cool, cloudy climates of United Kingdom vs. the hot/cold, sun-drenched landscapes of North America) for which the grow tube is designed to operate.

The PAR wavelengths being contained within the blue and the red band passes, a favorable pigment choice would seem to be magenta (blue plus red). However, there are other factors that warrant consideration in the design of a spectrally selective grow tube. For example, plants are able to detect and compare various wavelengths to gather environmental information and use that information to control growth and growth form in a process referred to as photomorphogenesis. Plants can detect radiation in the "far-red" band (approximately 700- to 750-nm), just beyond the red wavelengths detectable by the human eye. While chlorophyll strongly absorbs radiation in the red band (approximately 600- to 700-nm), substantial portions of the far-red band can be transmitted through the leaf. Natural sunlight has more red than far-red radiation. This is reversed under a canopy of green leaves because the transmissive properties of leaves attenuate the red band more than the far-red band.

Photomorphogenesis is driven in part by photoreceptors on the plant known as phytochrome. The phytochrome photoreceptors rely on the relative intensity of the red and the far-red bands to control plant form to be either sun- or shade-adapted. A shade-adapted plant will sacrifice root development and stem thickness, among other things, in favor of elongation in order to reach sunlight. The elongate structures sensitize the plant to wind, water and nutrient stress. A shade-adapted plant will have leaves with less protection against sun light, such that a smaller amount of sun light can damage the photosynthetic apparatus of a shade-adapted plant relative to a sun-adapted plant. Shade-adapted plants are prone to photoinhibition and photorespiration. Accordingly, grow tubes for sun-adapted plants should be designed to eliminate or greatly reduce far-red light.

Because of phytochrome photoreceptors, a strong correlation exists between tube diameter and plant dry weight biomass accumulation. Generally, the larger the diameter, the greater the biomass produced and the more the root system developed in relation to shoot growth. A reason that larger tubes produce better performing plants is the mitigation of leaf crowding that is present in smaller tubes and the attendant shade avoidance triggered by the phytochrome photoreceptors. The role of tube diameter was evinced when some companies released grow tubes for application in viticulture that were of narrow diameter. The narrowness of the tubes cause the leaves to bunch and overlap, causing the leaves to receive even less red light and triggering shade avoidance growth responses. The resident plants were strongly disadvantaged after the tubes were removed and the plants exposed to the sunny, treeless field of a typical vineyard, which lead to a high mortality rate.

A further consideration in the design of a spectrally selective grow tube is the role of blue light in forming a plant. Blue light orients the plant to the center of the sky. A clear sky is always bluer at the center (directly overhead) than at the horizon. At mid-day, a blue sky is present overhead that gets whiter at the horizon. In the morning and evening, the angle of the sun increases and more blue light is scattered at the horizon so that the horizon sky develops a red hue. Plants have evolved to respond to this by growing toward blue light.

Typically, plenty of blue light enters the top of the tube and is reflected at steep angles down the interior of the tube. The propagation of the blue light adequately tells the apical meristem of a plant which direction is up. A tube side wall that transmits only the blue band pass would stimulate side shoots that would take energy away from the vertical growth that would otherwise be directed towards plant establishment.

Nevertheless, there are some applications where a predominantly blue light is preferred, for example to enhance lateral branching of shrub species. In such applications, the side walls may be tailored to transmit blue light through the side walls of the tube.

Also, elimination of blue transmission through the sidewalls may not always be optimal, even where lateral branching is not an objective. Embodiments of the invention provide for a strong blue light by virtue of the blue sky light reflecting down the tube from the open top. Because of the dominance of the blue light propagating through the open top, it is not necessary to make the sidewalls entirely red. That is, embodiments of the invention can favor red pigments while enjoying the photosynthetic advantages of some blue in the sidewalls. Thus, certain embodiments of the invention may employ a reddish magenta color that favors red pigment while still containing some blue pigment.

Another consideration in the design of a spectrally selective grow tube is the role of green light. Until recently it was understood that while green light was not useful to the plant, it was also not harmful. Current research suggests green light actually slows or even stops plant growth. "Generally, the effects of green light oppose those directed by red and blue wavebands." See Folta, "Green Light: A Signal to Slow Down or Stop," Journal of Experimental Botany, July 2007. Folta cites many studies including one where the simple addition of green light produced shorter plants with reduced biomass.

Another aspect of green light as applied to grow tubes is the how a pigmentation produces the light. For example, a few years ago some growers replaced peach colored tubes with green colored tubes. Many independently reported reduced growth with the green tubes. Tree types that routinely grew out of the peach colored tube in the first season languished when placed in the green tube. It is further noted that the narrow tubes of the viticulture application that lead to high mortality rates were also green. It is thought that the green pigments, which can strongly absorb the wavelengths outside the green band pass, starve the plant of favorable PAR while letting the less favorable green band pass irradiate the plant.

Outside the visible spectrum, ultraviolet radiation (less than approximately 400-nm) can cause damage to the plant and infrared radiation (approximately 750-nm and greater) adds heat and can cause heat stress.

In sunny climates where over-heating due to solar radiation is a concern, the outer member may be tailored to reflect a substantial fraction of solar radiation across all spectra. With the dual wall configuration, the interior member and plant may absorb radiation and then emit infrared radiation. In one embodiment the transmissive properties of infrared radiation of the outer member allows a portion of infrared radiation re-radiated by the interior member to pass back through the outer member, thereby radioactively cooling the interior.

In many applications (e.g., in the north central United States, characterized by hot and cold days, both with full sun) only a small fraction of the solar radiation available is needed to grow certain plants, provided the radiation is at favorable wavelengths, primarily in the red and blue wavebands (e.g. a magenta translucent color). Recall that some studies suggest that less light actually produces more growth. Accordingly, the exterior member may be nearly opaque to help resolve problems associated with dieback and heat stress. Where aesthetic concerns are minimal, the spectrally selective grow tube may be tailored with a low translucent whitish outer wall that reflects as much non-beneficial radiation as possible. Such a design would also be the best for trees that are highly susceptible to winter die back in the north central United States and south central Canada. Furthermore, because the grow tube shields the plant from the growth-robbing effects of wind, large increases in growth can be realized because the plant grows even when the wind is blowing.

In cool and cloudy climates that may be warmth deficient (e.g. United Kingdom and Northern Europe), the invention may be tailored for warming the plant by selective containment of radiation. A pigment in the outer shell such as Ti02 may retard the escape of radiation therethrough to serve this purpose.

BRIEF DESCRIPTION OF THE DRAWINGS

FIG. 2 is a perspective view of a co-extruded spectrally selective grow tube with dual walls in an embodiment of the invention;

FIG. 3A is an enlarged partial sectional view of the co-extruded walls of FIG. 2;

FIG. 3B is an enlarged partial sectional view of an alternative co-extruded wall structure in an embodiment of the invention;

FIG. 6 is a schematic representation of sidewall radiation effects for radiation incident on the exterior member of the spectrally selective grow tube of FIG. 4;

FIG. 7 is a schematic representation of sidewall radiation effects for radiation incident on the interior member of the spectrally selective grow tube of FIG. 4;

DETAILED DESCRIPTION

Figure 1:
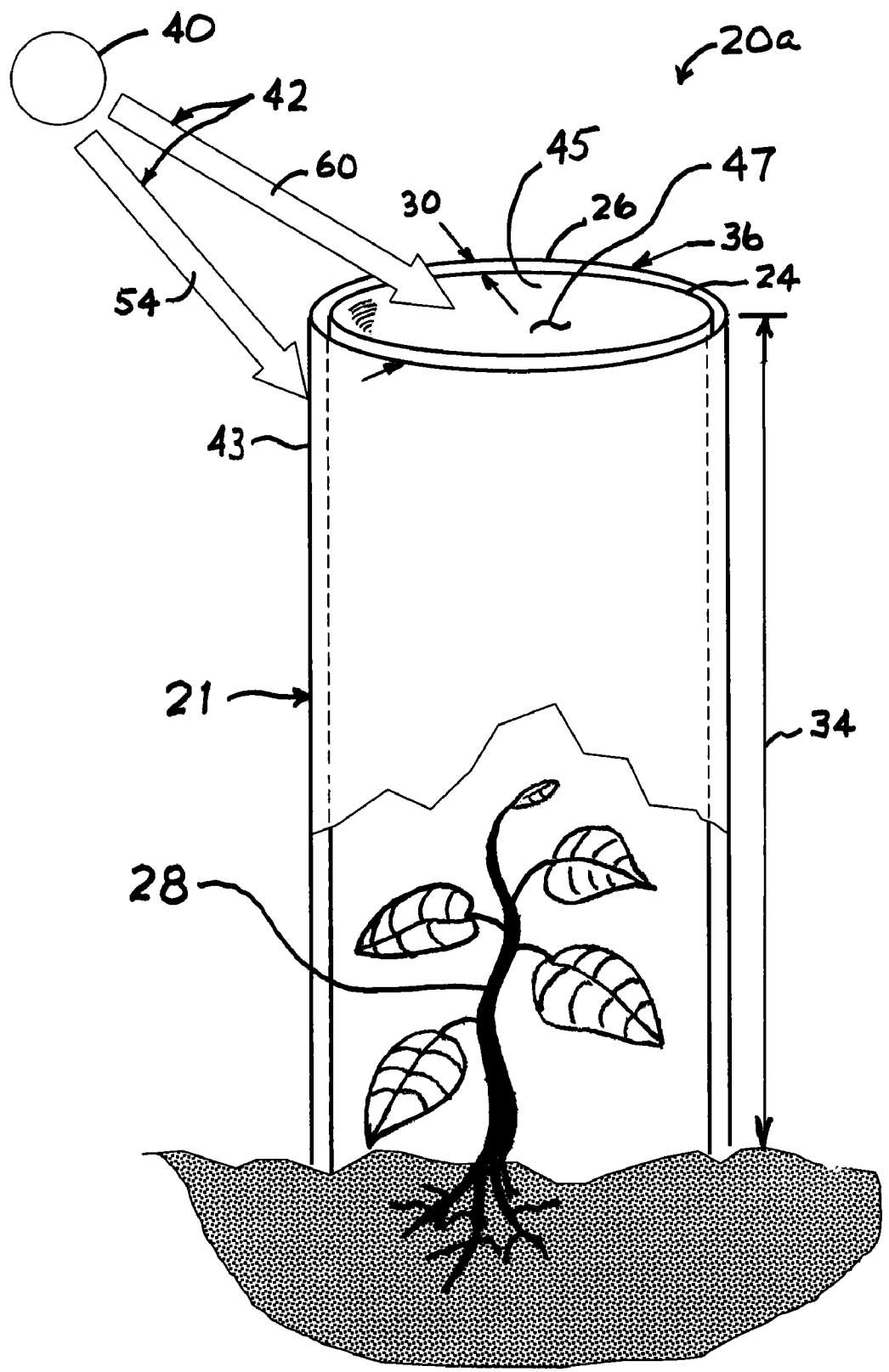
FIG. 1 is a partially cutaway perspective view of with dual walls in an embodiment of the invention.

Referring to FIG. 1, a spectrally selective grow tube 20a having a dual wall configuration 21 is depicted in an embodiment of the invention. The spectrally selective grow tube 20a may include an interior member 24 and an exterior member 26 that surrounds a resident plant 28. The interior and exterior members 24, 26 may be separated by an annular gap 30, as depicted in FIG. 1. The spectrally selective grow tube 20a may be further characterized as having an overall height 34 and an overall diameter 36. The interior and exterior members 24 and 26 of FIG. 1 are depicted as being structural wall members (i.e. both the interior and exterior members 24 and 26 have appropriate thickness and mechanical properties to define a shape).

Figure 4:
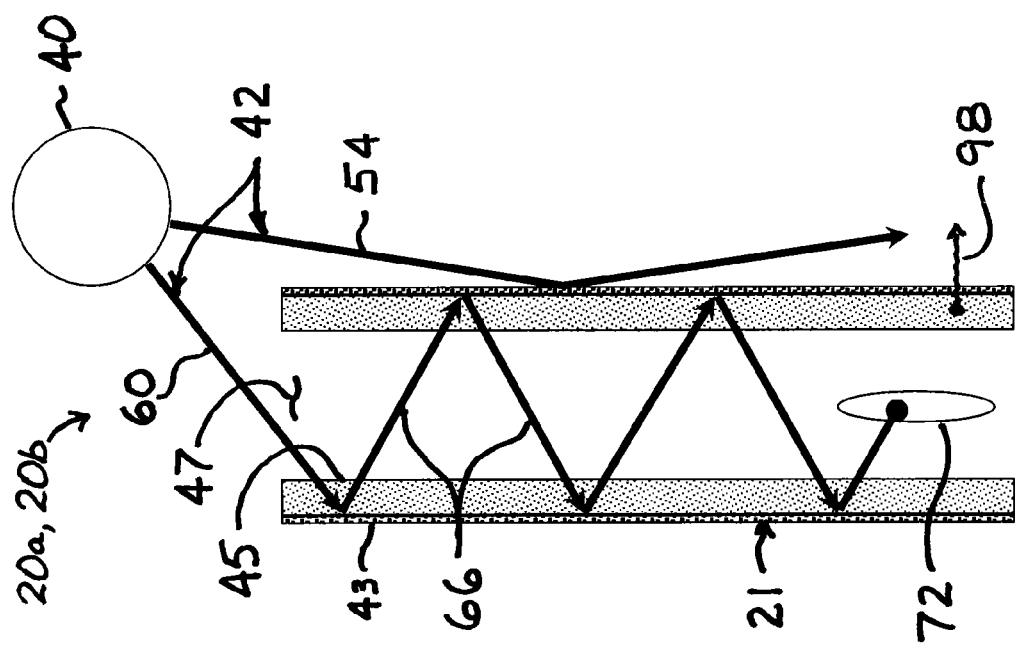
FIG. 4 is a schematic depicting inter-reflection of a spectrally selective grow tube having a dual wall configuration in an embodiment of the invention.

Alternatively, the spectrally selective grow tube 20a may be fabricated without an annular gap between the interior and exterior members 24 and 26 (i.e. annular gap 30 being substantially zero; see, e.g., FIG. 4). Such an embodiment may also comprise effectively a single structural wall member and a non-structural member. That is, the interior member 24 may define the spectrally selective grow tube 20a, and the exterior member 26 may comprise a non-structural member such as a coating or layer disposed on the outer surface of the interior member 24. The inverse arrangement may also be utilized (i.e. the exterior member 26 having structural thickness and interior member 24 comprising a non-structural coating or layer deposited on the interior of the exterior member 26).

The transmission of the exterior member 26 may be tailored to a specific application. For example, the exterior member 26 may be tailored to transmit approximately 1% to 30% of the solar radiation 42 in the visible spectrum. The interior member 24 may possess a red or a magenta color that partially reflects and partially transmits the red and/or blue band passes of the visible spectrum (FIGS. 6 and 7). Reflection of the exterior member 26 may be enhanced by a smooth outer surface.

In operation, the spectrally selective grow tube 20a may be positioned to surround the resident plant 28. The sun 40 emits solar radiation 42, a portion of which is incident on an exterior surface 43 of the exterior member 26 and a portion of which enters the interior member 24 through an open top 47, striking an interior surface 45 of the interior member 24. Typically, the transmission of the exterior member 26 may be tailored for lower transmission for applications where unattenuated sunlight is prevalent, and for higher transmissions for cloudy, cool climates.

Functionally, a substantial fraction of the solar radiation incident on the exterior member 26 may be reflected without being absorbed, particularly if the exterior of the exterior member 26 is smooth and highly reflective. In climates that experience strong sun in both hot and cold extremes, lower transmission of solar radiation may reduce heat stress, mitigate winter dieback, and promote good plant form. Lower transmission through the side walls combined with the blue light entering through the open top and reflecting at steep angles down the interior walls of the interior member 24 may also promote strong apical dominance.

Referring to FIG. 2, the spectrally selective grow tube 20b is depicted as having a stake 44 over which the spectrally selective grow tube 20b is threaded in an embodiment of the invention. (Hereinafter, any reference to spectrally selective grow tube(s) "20" without a letter suffix is intended to include any one of the spectrally selective grow tubes having the "20" prefix.) The interior and exterior members 24 and 26 in this embodiment comprise a co-extruded structure 46 that is characterized by intermittent gaps or cells 48 that run longitudinally down the walls of the spectrally selective grow tube 20b and provide an overall thickness 49. In the embodiment depicted in FIG. 2, the co-extruded structure 46 was extruded as a sheet and subsequently wrapped to form the spectrally selective grow tube 20b, with the overlap region being threaded over the stake 44. In other embodiments, the spectrally selective grow tube 20b may be attached to the stake 44 with a cable or zip tie.

Referring to FIG. 3A, an embodiment of the co-extruded structure 46 of FIG. 2 is presented. The co-extruded structure 46 may comprise the interior member 24 and the exterior member 26 as defining waved shapes 50 that touch or are fused together at intermittent contact regions 51.

Referring to FIG. 3B, an alternative embodiment of a co-extruded structure 46a is presented in an embodiment of the invention. In this embodiment, the interior and exterior members 24 and 26 may be separated by radial separators 52. The radial separators 52 may be integrally formed with the interior and exterior members 24 and 26 to form a unitary structure. The radial separators may comprise the material of the interior member 24 (as depicted), the exterior member 26, or both the interior and exterior members 24 and 26.

Typical dimensions for the spectrally selective grow tube can be an overall thickness 49 of approximately 6-mm or less and member thicknesses of 1-mm or less for interior and exterior members 24 and 26 comprising structural walls. Where the interior or exterior member 24 or 26 is non-structural, the thickness can be as thin as approximately 5-micrometers. These dimensions are offered as examples only and are not intended to be limiting for all embodiments of the invention.

Functionally, the co-extruded structure 46 can provide a unitary structure that is quickly and easily configured to a desired shape, such as a cylindrical surround. The intermittent gaps 48 promote thermal isolation between the interior and exterior members 24, 26, as the air within provides an insulation barrier therebetween, with conduction occurring only at the contact regions 51 or through the radial separators 52. In instances where the exterior member 26 operates at a higher temperature than the interior member 24, the thermal isolation helps promote the propagation of re-radiated energy 98 outward rather than inward for more effective cooling of the interior of the spectrally selective grow tube 20b.

Figure 5:
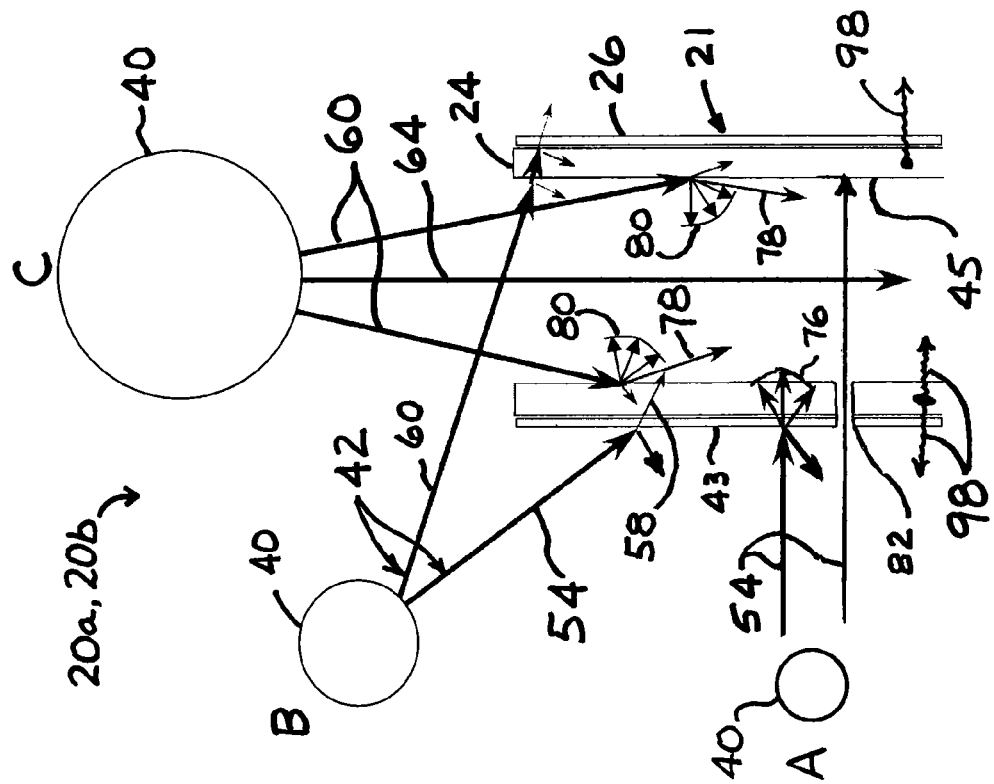
FIG. 5 is a schematic of the spectrally selective grow tube of FIG. 4 for different angles and intensities of sunlight incident thereon.

Referring to FIGS. 4 and 5, the dual wall configuration 21 of the spectrally selective grow tube 20 is depicted with the interior incident component 60 being subject to multiple inter-reflections 66 within the interior member 24 before striking a leaf 72 of the resident plant 28 within the dual wall configuration. In FIG. 5, the sun 40 is depicted at three different positions in the sky: position A, being close to the horizon, such as encountered at dusk or dawn; position B as being at an inclined position, such as encountered at mid-morning or mid-afternoon; and position C, such as encountered at mid-day, when the sun 40 is at its zenith. The solar radiation 42 at the various positions is characterized generally as having an exterior incident component 54 that is incident on the exterior surface 43 of the exterior member 26 of the dual wall configuration 21 and an interior incident component 60 that is incident on the interior surface 45 of the interior member 24. The relative magnitude of the interior and exterior components 54, 60 depends on the position A, B, C of the sun 40 in the sky. The increasing size of the sun 40 in progression from position A to position B to position C represents the increasing strength of the sun as it has less atmosphere to pass through and has a more direct angle of incidence as it passes through the progression.

In one embodiment, the transmitted component 58 of the exterior incident component 54 may be scattered by the exterior member 26, such as represented at numerical reference 76. Similarly, the interior surface 45 of the interior member 24 may be formed or otherwise conditioned to have a roughened texture that causes the interior incident component 60 to have a diffusely reflecting component 80 in addition to a spectrally reflecting component 78.

The roughened texture may be effected a variety of ways. The extrusion process itself may produce grooves on the surface(s) that produce a roughened texture. The surfaces may also be roughened mechanically, such as by sanding, sand blasting, raking the surface(s) or burning or melting a pattern onto the surfaces. Other methods include chemically treating the surface(s) such as by an etching process. Also, the addition of calcium carbonate to the wall can roughen the surface (but may also affect the transmittance of the substrate material). In some instances, mixing in resins that are known to be incompatible with the substrate material can cause roughness.

Functionally, the scattered and diffusely reflecting components 76 and 80 diffuses or spreads the direct radiation of the exterior and interior incident components 54 and 60 to provide a more uniform intensity distribution of light within the interior member 24. The resident plant 28 within the interior member 24 is thereby bathed in a more uniform light, which militates against damaging the photosynthetic structures of the resident plant 28.

The spectrally selective grow tube 20 may also be fitted with orifices 82 dimensioned to effectively have an aspect ratio (ratio of length to diameter) of three or greater. The orifices 82 may be oriented so that light from the sun when it is near the horizon is able to pass directly through the interior and exterior members 24 and 26. When the sun is near the horizon, the direct light is already softened and diffused by atmospheric attenuation. Accordingly, allowing some sunlight directly into the tube under these circumstances may not have a detrimental effect. When the sun is away from the horizon, light passing through the inlet to the orifice 82 (i.e. the definition of the orifice 82 on the outer surface of the exterior member 26) does not pass directly through the outlet of the aperture (i.e. the definition of the orifice 82 on the inner surface of the interior member 24). By this mechanism, no direct sunlight passes through the orifice when the sun is at elevated positions.

For multiple wall configurations, the "orifice" 82 may actually comprise two apertures in alignment (e.g., one on the interior member 24, the other on the exterior member 26), in which case the "length" of the orifice 82 is the dimension from the aperture on outer surface of the exterior member 26 to the aperture on the inner surface of the interior member 24. Between the apertures, there may be an intermittent gap (e.g., in the dual wall configuration of FIG. 2). While the orifice 82 in this construction does not comprise a continuous passageway from the exterior member 26 to the interior member 24, the alignment of the apertures produces the same effect.

Referring to FIGS. 6 and 7, the spectral function of the dual wall configuration 21 is depicted in an embodiment of the invention. A spectral breakdown 84 of the exterior and interior incident components 54 and 60 are presented, and include the following: infrared band pass 86 (wavelengths greater than approximately 750-nm); far-red band pass 88 (wavelengths of approximately 700- to 750-nm); red band pass 90 (wavelengths of approximately 600- to 700-nm); green band pass 92 (wavelengths of approximately 500- to 600-nm); blue band pass 94 (wavelengths of approximately 400- to 500-nm); and ultraviolet band pass 96 (wavelengths of approximately 400-nm and less).

In one embodiment, a reflective exterior coating 97 may be disposed on the exterior surface of the exterior member 26. A substantial component of the infrared band pass 86 may be transmitted through the exterior reflective coating 97 and the exterior member 26 and absorbed by the interior member 24 as depicted. The absorbed infrared band pass 86 may be transferred via re-radiated energy 98 by the interior member 24, with a portion of the re-radiated energy 98 being radiated outward through the exterior member 26. Another portion of the absorbed infrared band pass 86 may be conducted to the outer member 26 and transferred from the outer member 26 to the ambient surroundings via radiation 98 and convection 99.

The far-red band pass 88 may also be largely transmitted through the exterior reflective coating 97 and exterior member 26. However, in one embodiment, a substantial portion of the far-red band pass 88 is transmitted by the interior member 24, depicted by numerical reference 104. The transmitted far-red component 104 enters the interior member 24 to interact with the resident plant 28 and interior member 24. A portion of the energy of the far-red band pass 88 may also be absorbed by the interior member 24 to be re-radiated as infrared radiation through exterior member 26 and exterior reflective coating 97, or to be conducted to the exterior member 26 for transfer to the ambient environment via radiation and convection.

The exterior reflective coating 97 may be tailored to reflect a predetermined fraction of the red, green and blue band passes 90, 92 and 94 (herein referred to collectively as "visible light") of the solar radiation 42. Moreover, the interior member 24 may comprise a coloring or a pigment that selectively absorbs the red, green and blue band passes 90, 92 and 94 so that a larger fraction of the red and blue band passes 90 and 94 is passed through to the interior of the spectrally selective grow tube 20 than is the fraction of the green band pass 92, as depicted in FIG. 6. In some embodiments, the fraction of the green band pass 92 absorbed and reflected by the interior member 24 may be such that the remaining green light within the green band pass 92 that is transmitted is insignificant, as depicted in FIG. 7.

The exterior reflective coating 97 may be tailored to reflect a predetermined fraction of the exterior incident component 54, and may be further tailored to be more reflective of the red, green and blue band passes 90, 92 and 94 than for the far-red band pass 88 and the infrared band pass 86. For example, the exterior reflective coating 97 may be configured to reflect 80% of visible light, while reflecting a much smaller portion of the infrared band pass 86. In other embodiments, the reflected portion of the visible light may be greater (e.g. 99%). The visible light that passes through the interior member 24 is subsequently and selectively absorbed, reflected, and transmitted by the resident plant 28 and/or its leaves 72, as well as by the interior member 24.

In some embodiments, the exterior member 26 may be nearly opaque in the visible spectrum, thus largely propagating radiation within the interior member 24. The color of a visibly opaque exterior member 26 may be tailored for aesthetic reasons. The outside wall could be any color (e.g., green, brown, gray, camouflage), with a tradeoff being higher operating temperatures. If the operating temperature is too high the tube can be ventilated. If the exterior surface of the exterior member 26 is smooth and highly reflective, a substantial fraction of the exterior incident component 54 may be reflected away without absorption and conversion to heat, regardless of the color.

In another embodiment, the exterior reflective coating 97 may comprise an interference coating that selectively reflects a greater fraction of the green band pass 92 than it does of the red band pass 90 and/or the blue band pass 94.

The exterior reflective coating 97 as well as the exterior member 26 may be tailored or selected to reflect and/or absorb ultraviolet band pass 96. A portion of the absorbed ultraviolet band pass 96 may re-radiate outward to the ambient surroundings as infrared radiation. Energy from the absorbed ultraviolet band pass 96 may also be transferred via convection heat transfer, such as by free convection due to buoyancy effects of ambient air in contact with the exterior surface 43, or by forced convection such as caused by wind.

The interior and exterior members 24 and 26 may be fabricated from materials such as low density and/or high density polyethylene, polypropylene, polyethylene terephthalate, polystyrene, polyvinylchloride (PVC) or other suitable materials having transmittance properties in the infrared portion of the electromagnetic spectrum suitable for the application. For co-extruded embodiments, whatever materials are chosen for the interior and exterior members 24 and 26 should be compatible with each other to form a unitary body. The exterior member 26 may also comprise an exterior reflective coating 97 such as titanium dioxide (TiO2) or zinc sulfide (ZnS) that can be tailored to reflect a substantial portion of the incident solar radiation 42 in the visible spectrum while allowing substantial transmission of infrared radiation.

The interior and/or exterior members 24, 26 may also be impregnated with a bittering agent during the extrusion process. Some bittering agents are strong enough to require only trace amounts to accomplish the bittering effect, and therefore do not substantially affect the absorption and transmittance of the material.

Functionally, the purpose of having lower reflectivity in the red and infrared band passes 88 and 86 is to enable re-radiation from the interior member 24 to escape through the exterior reflective coating 86, thus mitigating radiative overheating of the resident plant 28 contained within the spectrally selective grow tube 20. The variation of the reflectivity in the visible spectrum of the solar radiation 42 enables the radiation load passed through to the interior of the dual wall configuration 21 to be tailored according to the requirements of local sunshine. For example, a lower reflectance (or higher transmittance) may be chosen for the exterior reflective coating 97 if the spectrally selective grow tube 20 is to be used in northern climates that are typically cloudy, such as United Kingdom. Higher reflectance may be utilized for climates that are subject to stronger sunlight, such as the north and central United States.

An advantage of utilizing an interference coating for the exterior reflective coating 97 is that such a configuration may enhance the spectral selection of the red band pass 90 and the blue band pass 94 while enabling the interior member 24 to absorb less of the green band pass 92. With less green band pass 92 being absorbed, there is less energy from the infrared band pass 86 being re-radiated to the interior of the spectrally selective grow tube 20, which may reduce the heat stress to the resident plant 28.

The inclusion of a bittering agent provides the advantage of deterring herbivores such as deer, bear, beaver, porcupines and rodents from chewing through the grow tube. The inclusion of bittering agent may be limited to the interior member 24 only so that personnel are exposed to less bittering agent when handling the grow tubes.

Fabrications that utilize polyethylene for the interior member 24 can have the effect of discouraging the colonization of insects such as wasps and hornets.

Figure 8:
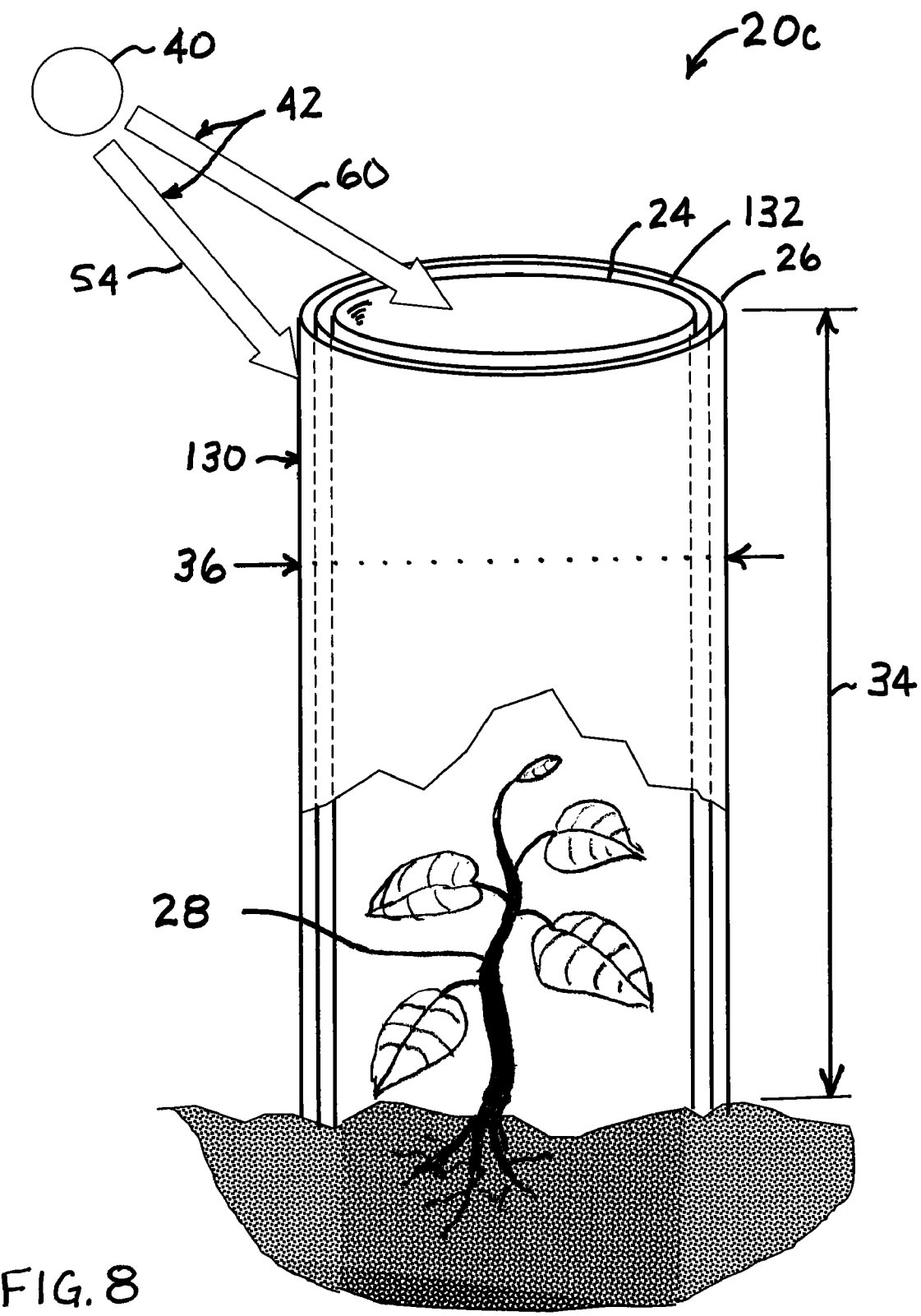
FIG. 8 is a schematic depicting inter-reflection of a spectrally selective grow tube having a triple wall configuration in an embodiment of the invention.
Figure 9:
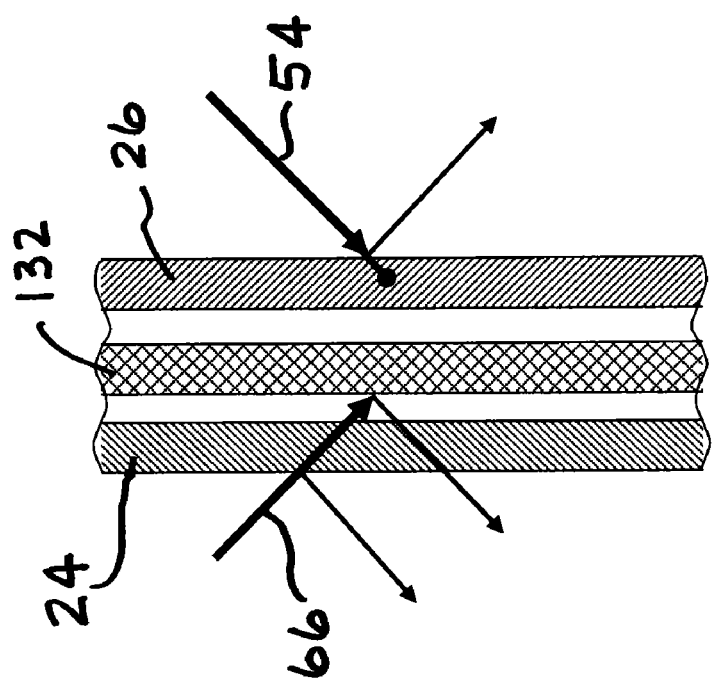
FIG. 9 illustrates the reflection off the intermediate member of FIG. 8.

Referring to FIGS. 8 and 9, a triple wall configuration 130 of a spectrally selective grow tube 20c is depicted in an embodiment of the invention. The triple wall configuration 130 includes, an intermediate member 132 disposed between the interior and exterior members 24 and 26.

In one embodiment, the exterior member 26 may be tailored or selected to reflect an aesthetic or cryptic opaque color such as brown, green or gray to give the grow tube 20c a desired appearance. The non-reflected portion of the exterior incident component 54 may be absorbed by the exterior member 26. The interior member 24 may again be of a magenta color, characteristic of a material, coloring or pigment that has a high reflectivity in both in the blue and the red band passes 94 and 90, while having a high absorptivity in the green band pass 92. The intermediate member 132 may comprise an opaque white material or layer. The white layer of the intermediate member 132 and the interior member 24 may comprise an interference pigment or dye. The exterior member 26 may comprise an interference pigment and/or a metal oxide type pigments that provide desired aesthetic colors or qualities. Alternatively, an opaque white reflective coating (not depicted) on the outer perimeter of the interior member 24 may be used in addition to or as a substitution for the intermediate member 132.

Functionally, the intermediate member 132 may be configured to serve as a radiation shield to contain and inter-reflect light 66 from the red and blue band passes 90, 94 within the tube, as depicted in FIG. 9. A white coating on the outer perimeter of the interior member 26 may serve the same purpose. The exterior member 26 serves to block the exterior incident component 54 of radiation from passing through the triple wall configuration 130. Alternatively, the exterior member 26 may transmit some of the exterior incident component 54 for reflection by the intermediate member 132 or the white coating.

The triple wall configuration 130 may comprise three concentric walls formed in an ABC co-extrusion process, with the intermediate layer being heavily doped with a highly reflective or highly scattering pigment to affect the radiation shielding function described above. The ABC co-extrusion process may extrude a cylinder or other continuous cross-sectional form, or a sheet that is subsequently formed into a desired cross-sectional form.

The choice of a cryptic-colored or otherwise camouflaged exterior militates against disturbance of the tube by humans and animals by rendering the grow tube unobtrusive. The security and survival of the seedling protected by the tube is dependent on it remaining undisturbed. An unobtrusive tree tube is more likely to be undisturbed because it is less likely to be seen.

The various spectrally selective grow tubes 20 may be of sufficient overall height 34 to protect the tree below the browse line. Example overall heights 34 are 0.6- and 1.2-m, and can range from 0.3-m to over 2-m. Spectrally selective grow tubes 20 having substantially opaque exterior members 26 may be dimensioned with larger diameters than for tubes having greater transmission in order to prevent the resident plant 28 from becoming shade-adapted. Generally, longer tubes may also benefit from a larger diameter than the shorter tubes, again to prevent the resident plant 28 from becoming shade-adapted.

The exterior member 26 may also comprise a greening interference pigment that transmits in the red and blue band passes 90 and 94. This design has the capability of increasing the amount of red and blue light available to the resident plant 28 while giving the exterior member 26 a green appearance. The exterior member 26 in such a configuration may be of a material that blocks ultraviolet and infrared radiation.

Figure 10:
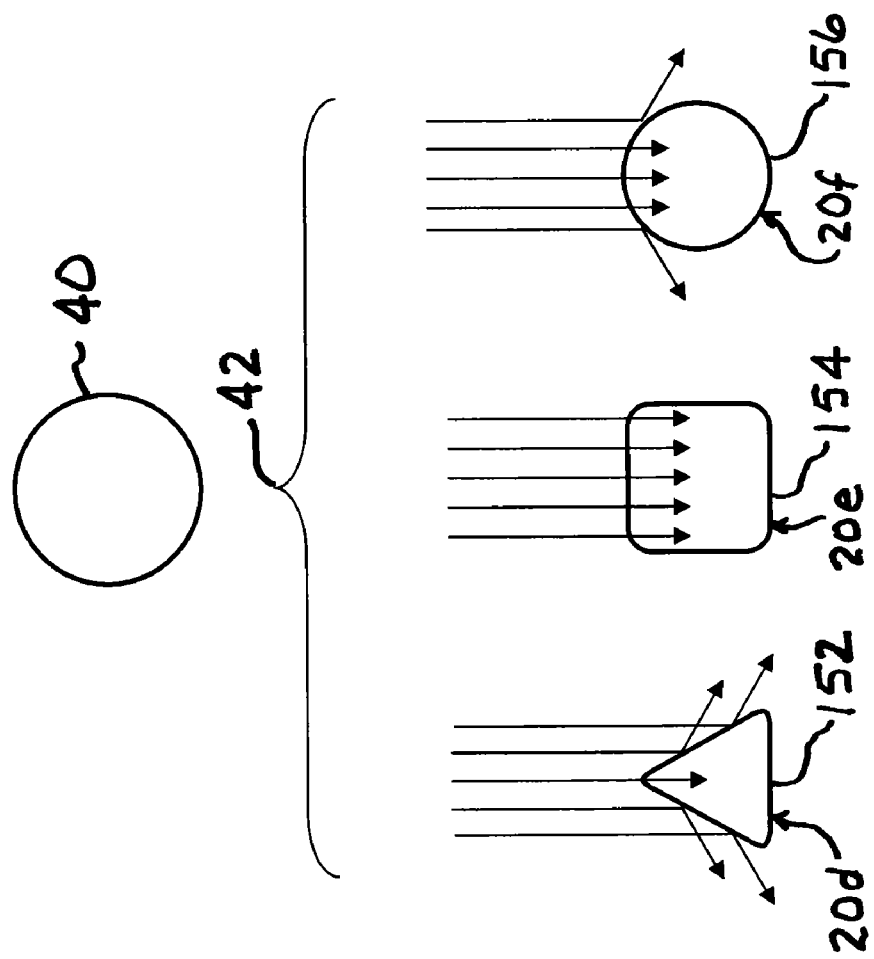
FIG. 10 depicts the solar gain and heat load of various shaped grow tubes in an embodiment of the invention.

Referring to FIG. 10, the effect of various geometries for spectrally selective grow tubes and their effect in the management of radiation gain is depicted in various embodiments of the invention. The FIG. 10 depiction shows spectrally selective grow tubes 20$d$, 20$e$ and 20$f$ having a triangular cross-section 152, a square cross-section 154 and a circular cross-section 156, respectively. It is noted that while the cross-sections 152, 154 and 156 are depicted as having a single wall, they may include the multiple walls in accordance with the other aspects of the invention disclosed herein.

The general principle behind utilizing differing shapes is that materials tend to reflect more radiation as the angle of incidence of light or radiation departs from the normal. Accordingly, for the triangular cross-section 152, there can be substantial reflection when the spectrally selective grow tube 20$d$ is oriented with respect to the sun 40 as depicted. For the square cross-section 154, the angle of incidence is substantially normal in the depicted orientation, which tends to minimize the fraction of solar radiation 42 that is reflected. For the circular cross-section 156, there is a variation in the angles of incidence ranging from normal to nearly parallel.

In operation, the square cross-section 154 can transmit a greater fraction of the incident solar radiation 42 for a spectrally selective grow tube 20 of a given spectral tailoring. Accordingly, the square cross-section 154 may find utility where there is a paucity of sunlight, such as in far northern locations. The triangular cross-section 152, when properly oriented, may reflect a substantial portion of the incident radiation, thereby reducing the radiation gain relative to the square cross-section 154 that is normal to the sun 40. The circular cross-section 156 may have a solar gain that is between that of the square and triangular cross-sections 154 and 152.

With respect to the circular cross-section 156, note that only a small arc of the tube surface is substantially normal to the exterior incident component 54. The remaining exterior incident component 54 is incident at angles other than substantially normal, and will tend to have a larger reflected component. Accordingly, the spectrally selective grow tube 20$f$ having the circular cross-section 156 generally operates at a cooler temperature than the counterpart square cross-section 154.

Figure 11:
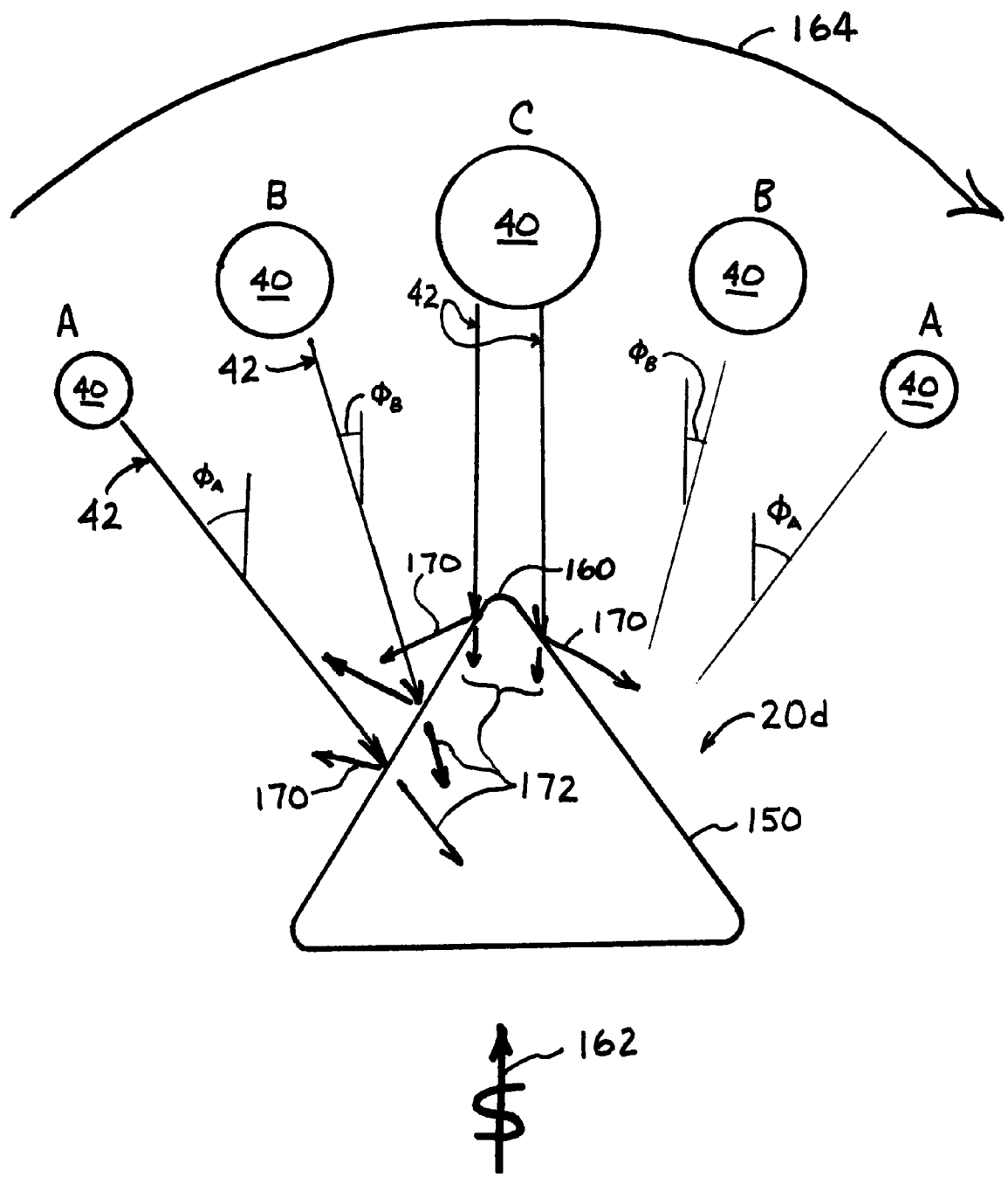
FIG. 11 illustrates variable transmission of radiation due to the geometry of a triangular cross-section in an embodiment of the invention.
Figure 12:
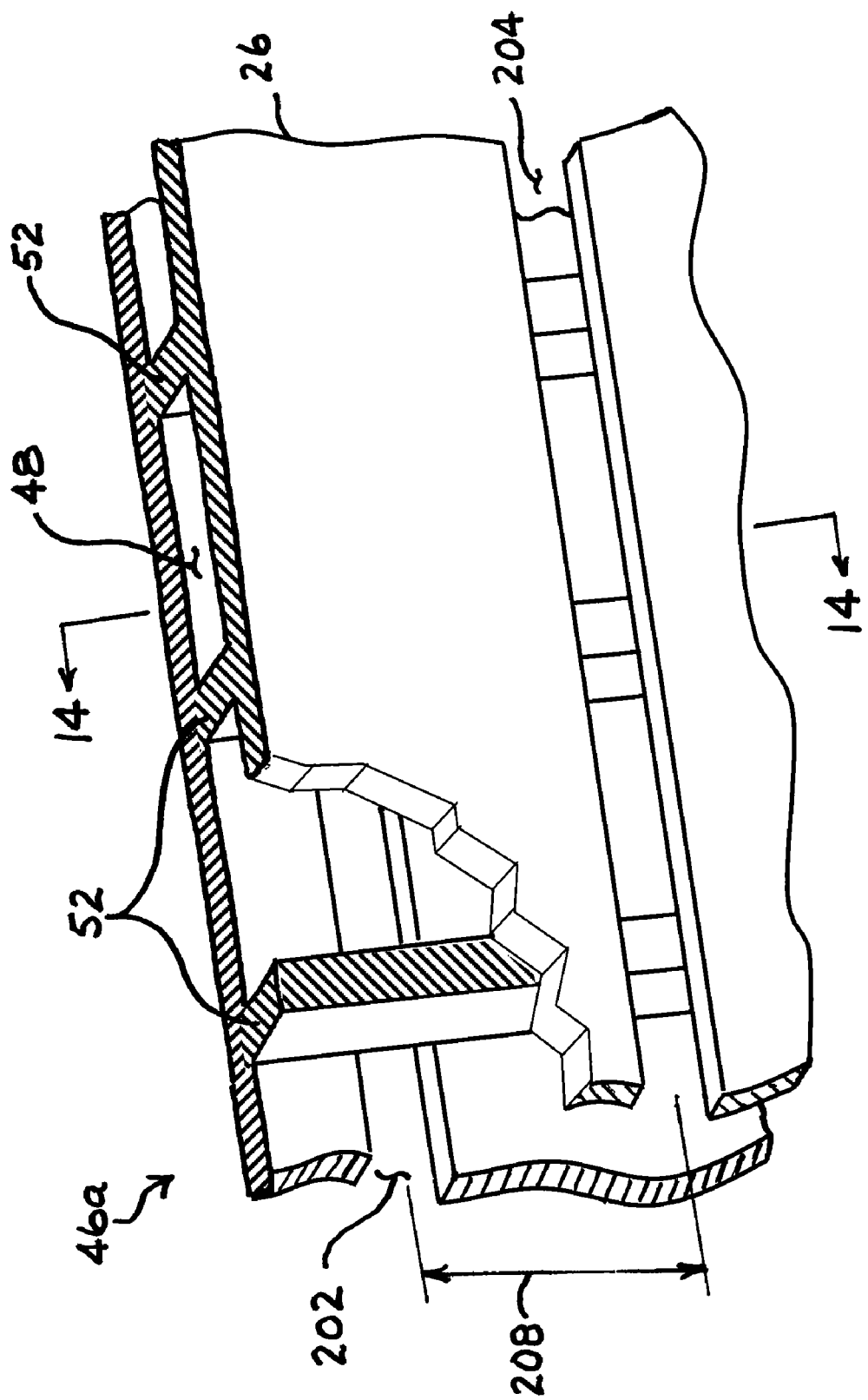
FIG. 12 is a partial cutaway view of a section of the dual wall configuration of FIG. 3B having ventilation slots in an embodiment of the invention.

Referring to FIG. 11, a more detailed description of the operation of the triangular cross-section 152 is presented for an embodiment of the invention. In this embodiment, the triangular cross-section 152 is oriented with an apex 160 pointing due south, as shown by the southern indicator 162. During the daylight hours, the sun 40 follows a progression 164 across the sky from east to west. As described earlier, the positional indicators A, B and C represent the sun in various positions in the sky, with A being near the horizon (eastern or western) and C being when the sun is at its zenith. Again, the varying size of the suns in the A, B and C positions represent the relative strength of the solar radiation 42.

The position of the sun 40 relative to the southern indicator 162 may be described by a "solar azimuth" $\Phi$, which is defined herein as the angle between a line from the spectrally selective grow tube 20$d$ to the sun 40 projected on the ground and a line from the spectrally selective grow tube 20$d$ due south. The solar azimuth for the A and the B positions are represented by the angles $\Phi A$ and $\Phi B$. There is no solar azimuth represented for the C position because $\Phi$ is zero when the sun 40 is due south. Note that the solar azimuth $\Phi$ decreases as the strength of the sun increases.

The solar radiation 42, or more specifically the exterior incident component 54, is characterized in FIG. 11 as having a smaller reflectance vector 170 (representing the fraction of reflected radiation) and a greater transmittance vector 172 (representing the fraction of transmitted radiation) as the angle of incidence of the exterior incident component 54 with the triangular cross-section 152 departs from normal. This effect may also be characterized in that as the solar azimuth $\Phi$ decreases, so does the magnitude of the transmittance vector 172.

In operation, the arrangement depicted in FIG. 11 enables a greater fraction of the exterior incident component 54 to be transmitted when the sun 40 is at its weakest strength in the sky, and to reflect more (transmit less) of the exterior incident component 54 as the sun 40 becomes stronger. Therefore, the geometry enables a degree of selectivity in attenuating the exterior incident component 54 relative to the strength of the solar radiation 42.

It is noted that the same effect may be accomplished with cross-sections other than the triangular cross-section 152. Basically, any cross-section which provides varying effective angles of incidence as the sun tracks through the progression 164 can be oriented to have the above described effect, such as a diamond or an elliptical cross-section.

Referring to FIGS. 12 through 15, the dual walls of the unitary co-extruded structure 46 of the spectrally selective grow tube 20b are depicted having interior and exterior ventilation slots or apertures 202 and 204 in an embodiment of the invention. The interior and exterior ventilation apertures 202 and 204 may be displaced according to an axial offset 208 relative to each other. There may be a duplicity of such slots at a plurality of axial locations (not depicted) along the axial length of the spectrally selective grow tube 20b.

The interior ventilation apertures 202 may be characterized as defining an area 210 that, when projected in an outward direction normal to the interior member 24, is subtended by the exterior member 26. Likewise, the exterior ventilation apertures 204 may be characterized as defining an area 212 that, when projected in an inward direction normal to the exterior member 26, is subtended by the interior member 24. In embodiments that include the axial offset 208, the interior and exterior ventilation apertures 202 and 204 may be dimensioned so that the projections of areas 210 and 212 onto the exterior and interior members 26 and 24, respectively, do not overlap.

Figure 13:
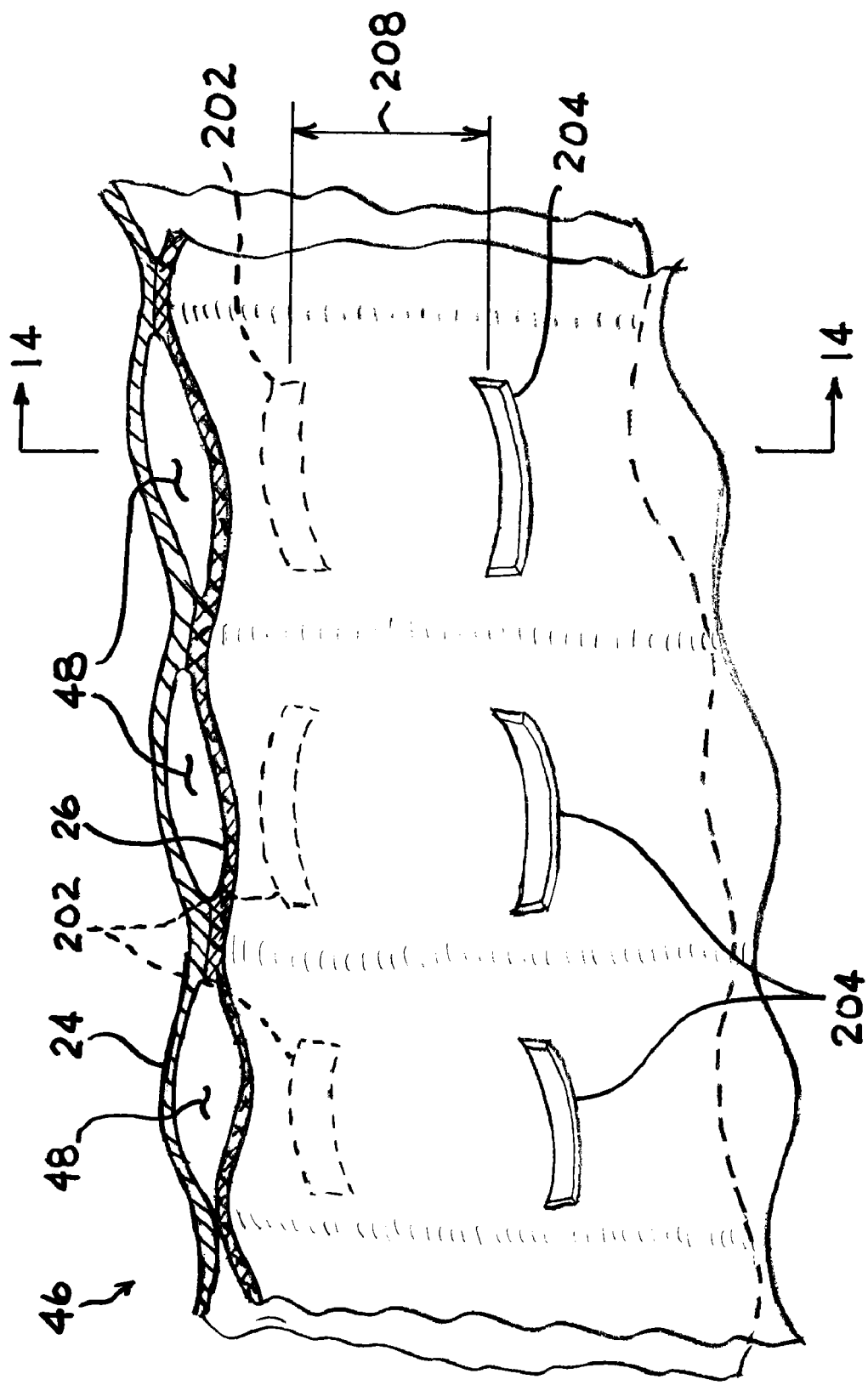
FIG. 13 is a partial cutaway view of a section of the dual wall configuration of FIG. 3A having ventilation slots in an embodiment of the invention.
Figure 15:
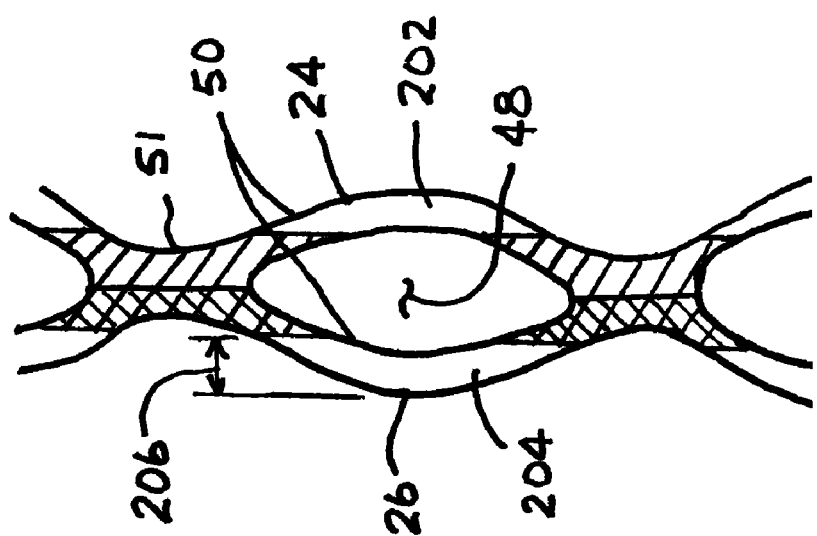
FIG. 15 is a partial sectional view of the ventilation slots in FIG. 12.
Figure 14:
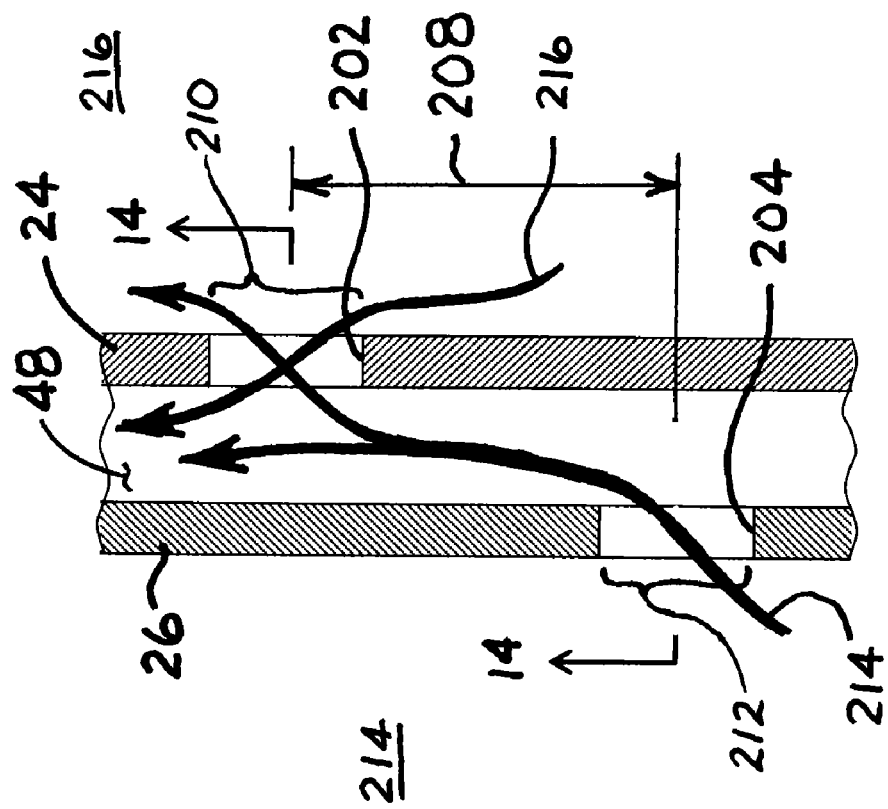
FIG. 14 is a partial sectional view of the section of dual wall in FIG. 12 or FIG. 13.

The interior and exterior apertures 202 and 204 may each comprise a continuous slot (FIG. 12) or intermittent apertures (FIG. 13). The interior and exterior ventilation apertures 202 and 204 may be formed by removing material along a line or lines that cut into the internal and external walls 24 and 26, respectively. For the co-extruded structure 46 that comprises members defining waved shapes 50 (e.g., FIG. 2), the removal of material may be to a depth 206 that is less than the amplitude of the waved shapes 50 (FIG. 15) to form apertures that are non-continuous. The material removal operation may be performed numerous ways, including with a sharp edge or with a laser.

In operation, the solar radiation load imposed on the spectrally selective grow tube 20b may cause the air within the intermittent gap 48 to be at an elevated temperature relative to the ambient air 214 and/or the interior air 216 within the interior member 24. Buoyancy forces may then cause a "chimney effect" on the air within the intermittent gap to lift upward, causing ambient air 214 and/or interior air 216 to be drawn into the intermittent gap 48 via the apertures 202 and/or 204. The displaced interior air 216 may be replaced by ambient air through the open top 47. Also, some of the ambient air 214 that is drawn through the exterior apertures 204 may be drawn into the interior member 24 through the interior apertures 202. By these mechanisms, the unitary co-extruded structure 46 may be convectively cooled and the resident plant 28 replenished with carbon dioxide from the ambient air 214.

In some embodiments, the exterior member 26 may run substantially warmer than the interior member 24, or vice-versa. The thermal gradient across the intermittent gaps 48 may dominate the buoyancy forces and cause recirculation cells to form rather than the axial chimney effect flow. That is, air within the intermittent gaps 48 may be in an up flow along the boundary formed by the exterior member 26 (if it is warmer than interior member 24) and a down flow along the boundary formed by the interior member 24. Such recirculation can still cause ambient air to enter the exterior ventilation apertures 204.

The presence of the apertures can enable the exterior member 26 or, where implemented, the exterior reflective coating 97 to have a high degree of opacity. Light passing through the apertures or slots 204 irradiate the interior member 24 at full intensity, but only over a portion of the surface. Hence, an opaque grow tube having open apertures over, for example, 30% of its surface can effectively have a transmittance of roughly 30%.

The offset configuration of the interior and exterior apertures or slots 202 and 204 provides a barrier against herbicides entering the spectrally selective grow tube 20 while still providing the benefits of ventilation. Herbicide droplets that pass through the exterior ventilation apertures 204 are intercepted by the interior member 24.

Another advantage of the offset relationship between the interior and exterior apertures or slots 202 and 204 is that it prevents wind from directly impinging on the resident plant 28 by causing wind to flow through a tortuous path, thereby reducing the kinetic energy of the wind-driven air as it passes through the spectrally selective grow tube 20. The offset configuration may be of benefit to a young plant recovering from transplant shock, when the plant is particularly sensitive to wind.

It is noted that configurations where the projections of areas 210 and 212 do not overlap still condition the incoming light in accordance with the principles of the invention. Light passing through the exterior slots or apertures 204 are intercepted by the interior member 24, and thus can be filtered to propagate PAR and to diffuse the light, instead of directly irradiating the plant which can cause photoinhibition.

The ability to have a high opacity exterior surface provides opportunities for camouflaging the spectrally selective grow tubes 20. Camouflage is based on breaking up regular lines. Black is a part of many camouflage patterns because animals and humans interpret black in the field of vision as shadow. Accordingly, the exterior reflective coating 97 may comprise a cryptically colored base color such as green, brown or gray upon which black areas of a repeating or a randomly generated pattern are printed. The overlay of the black onto the base color can be accomplished relatively inexpensively by printing black dot matrix patterns on cryptically colored plastic.

References to relative terms such as upper and lower, front and back, left and right, or the like, are intended for convenience of description and are not contemplated to limit the invention, or its components, to any specific orientation. All dimensions depicted in the figures may vary with a potential design and the intended use of a specific embodiment of this invention without departing from the scope thereof.

Each of the additional figures and methods disclosed herein may be used separately, or in conjunction with other features and methods, to provide improved devices, systems and methods for making and using the same. Therefore, combinations of features and methods disclosed herein may not be necessary to practice the invention in its broadest sense and are instead disclosed merely to particularly describe representative embodiments of the invention.

For purposes of interpreting the claims for the present invention, it is expressly intended that the provisions of Section 112, sixth paragraph of 35 U.S.C. are not to be invoked unless the specific terms "means for" or "step for" are recited in the subject claim.

What is claimed is:

1. A grow tube, comprising:
   an interior member that is at least partially transparent to electromagnetic radiation in the visible portion of the electromagnetic spectrum and substantially opaque to electromagnetic radiation in the ultraviolet portion of the electromagnetic spectrum, said interior member having a greater transmittance in at least one of a blue and a red band pass than in a green band pass;
   an exterior member substantially surrounding said interior member; and
   an intermediate member disposed between said interior and exterior members, said intermediate member being opaque and having a reflectance that reflects electromagnetic radiation incident on said intermediate member in said red and blue band passes.

2. The grow tube of claim 1, wherein said exterior member is substantially opaque to electromagnetic radiation in the ultraviolet, the visible and the infrared portions of the electromagnetic spectrum.

3. The grow tube of claim 1, wherein said exterior member is partially transparent to electromagnetic radiation in the visible portion of the electromagnetic spectrum, and wherein electromagnetic radiation passing through said exterior member is substantially reflected by said intermediate member.

4. The grow tube of claim 1, wherein said interior member comprises greening interference pigments.

5. The grow tube of claim 1, wherein at least one of said interior member, said exterior member and said intermediate member includes at least one of a film and a coating.

6. The grow tube of claim 1 wherein said exterior member is at least partially transparent to electromagnetic radiation in the infrared portion of the electromagnetic spectrum.

7. The grow tube of claim 1 wherein said exterior member comprises a coating that transmits a fraction of visible light incident thereupon, said fraction being less than approximately 30%.

8. The grow tube of claim 7 wherein said fraction is approximately 1%.

9. The grow tube of claim 1 wherein said interior member is comprised of polyethylene.

10. The grow tube of claim 1 wherein at least one of said interior member and said exterior member comprises a bittering agent.

11. The grow tube of claim 1 wherein said interior member includes surface structure for scatter of electromagnetic radiation transmitted therethrough.

12. The grow tube of claim 1 wherein said interior member has greater transmittance in both of said red band pass and said blue band pass than in said green band pass.

13. The grow tube of claim 12 wherein said interior member has greater transmittance in said red band pass than in said blue band pass.

14. The grow tube of claim 1 wherein a majority of said electromagnetic radiation incident on said intermediate member in said red and blue bandpasses is reflected by said intermediate member.

15. The grow tube of claim 1, wherein said interior member comprises at least one of a dye and a metal oxide pigment.

* * * * *